(12) United States Patent
Ohara

(10) Patent No.: US 7,430,484 B2
(45) Date of Patent: Sep. 30, 2008

(54) SIGNAL PROCESSING METHOD AND APPARATUS FOR USE IN REAL-TIME SUBNANOMETER SCALE POSITION MEASUREMENTS WITH THE AID OF PROBING SENSORS AND BEAMS SCANNING PERIODICALLY UNDULATING SURFACES SUCH AS GRATINGS AND DIFFRACTION PATTERNS GENERATED THEREBY, AND THE LIKE

(76) Inventor: Tetsuo Ohara, 8C Pondview Dr., Sutton, MA (US) 01590

( * ) Notice: Subject to any disclaimer, the term of this patent is extended or adjusted under 35 U.S.C. 154(b) by 270 days.

(21) Appl. No.: 11/396,104

(22) Filed: Mar. 31, 2006

(65) Prior Publication Data

US 2007/0233413 A1    Oct. 4, 2007

(51) Int. Cl.
*G01R 23/00* (2006.01)
*G01R 35/00* (2006.01)

(52) U.S. Cl. .................. 702/75; 356/616; 250/306; 702/106

(58) Field of Classification Search .................. 702/75, 702/106, 111; 250/306; 356/616; 73/579; 324/76.11; 318/729
See application file for complete search history.

(56) References Cited

U.S. PATENT DOCUMENTS

| | | | | |
|---|---|---|---|---|
| 5,589,686 A | * | 12/1996 | Ohara | ............. 250/306 |
| 5,744,799 A | * | 4/1998 | Ohara | ............. 250/306 |
| 6,639,686 B1 | * | 10/2003 | Ohara | ............. 356/616 |

* cited by examiner

*Primary Examiner*—John H Le
(74) *Attorney, Agent, or Firm*—Rines and Rines

(57) ABSTRACT

An improved signal processing method and apparatus are presented for use in real-time sub-nanometer scale position measurements with the aid of probing sensors and/or beams scanning periodically undulating surfaces such as a grating and diffraction patterns generated thereby, and the like, enabling greater sub-nanometer precision, higher stage scanner movement speeds, and simultaneous high accuracy and top speed measuring capabilities.

27 Claims, 7 Drawing Sheets

SIGNAL PROCESSING METHOD AND APPARATUS FOR USE IN REAL-TIME SUBNANOMETER SCALE POSITION MEASUREMENTS WITH THE AID OF PROBING SENSORS AND BEAMS SCANNING PERIODICALLY UNDULATING SURFACES SUCH AS GRATINGS AND DIFFRACTION PATTERNS GENERATED THEREBY, AND THE LIKE

FIELD OF INVENTION

The present invention relates to the field of real-time nanometer and subnanometer position measurements and the like with the aid of probing sensors and optical beams scanning over optical grating or other undulating surfaces and the like as described in my earlier U.S. Pat. Nos. 5,589,686; 5,744,799; and 6,639,686; the invention being more particularly directed, however, to significant discoveries in the improvement of signal processing of the signals coming from the probe oscillation sensor or beam scanner or the like, that strikingly overcome prior art limitations in minute errors in probe oscillation amplitude measurement, difficulties in maintaining position measurement accuracy when the scanning stage moves at extremely high speeds (e.g. >10 mm/sec), and achieving high accuracy and top speed measuring capability at the same time.

BACKGROUND OF INVENTION

As explained in my said earlier patents, limitations in prior art laser beam interferometry measurements and in similar prior optical scanning techniques led to the development of the oscillating sensing probes between which and grating or other surfaces, sensing fields were established, as described particularly in my said earlier U.S. Pat. Nos. 5,589,686 and 5,744,799. These scanning sensors relied upon the generation of sinusoidal output voltages, measured after passing through the surface from the oscillation-controlled probe. By comparison of the phase and amplitude of the oscillation-controlling and resulting sinusoidal output voltages, the development on a continual basis of positional signals indicative of the position of the probe along the surface relative to an adjacent apex of undulations therein, was enabled.

As detailed in said patents, real-time continual nanometer scale position measurement data of the location of a sensing probe relatively moving with respect to an undulating surface stage (an atomic surface or a grating or the like) is achieved through rapid oscillating of the probe under the control of sinusoidal voltages as a sensing field established between the surface and the probe, producing output sinusoidal voltages by the current generated in the sensing field. As therein detailed, signal-processing comparison of the phase and amplitude of such output voltages provides positional signals indicative of the direction and distance off the apex of the nearest atom or undulation of the surface. Circuits for developing such positional signals are disclosed in said patents and, where desired, feedback is effected of the positional signals to control the relative movement of the probe and surface.

There were, however, circumstances where it became desirable to use probing by energy beams, such as by laser beams and other energy beams, as distinguished from physical probe sensors such as capacitor or magnetic probes illustrated in said patents; and, indeed, to use the beam energy not only in probing over the surface, but also as a contributor to the setting up of the sensing energy field with the atomic grating or other surface itself.

The following sinusoidally phase modulated signal formed as a result of scanning the beam over the grating surface was disclosed in Equation (1) in my U.S. Pat. No. 5,744,799 as, $$p = A\cos(r\omega'\sin\omega t + \omega' X_0) \quad (1)$$
$$= AJ_0\cos(\omega' X_0) - 2A\sin(\omega' X_0)\sum J_{2m-1}\sin(2m-1)\omega t +$$
$$2A\cos(\omega' X_0)\sum J_{2m}\cos 2m\omega t,$$

where r is a grating or fringe pattern or probe oscillation amplitude; $\omega$ is an angular velocity of the fringe or probe oscillation; $X_0$ is the object position or distance to be measured, $\omega'$ is a spatial frequency of the grating or fringe pattern, A is the amplitude of the modulated current, and $J_{2m}$, $J_{2m-1}$ represent the Bessel function of the first kind.

A similar form of equation, however, can be derived for many applications, such as detection of fringe position in Michelson interferometer and absorption stabilized laser wavelength control (D P Blair and P H Sydenham, Phase sensitive detection as a means to recover signals buried in noise, J. Phys. E: Scientific Instruments 1975 Vol. 8, 621-7), where the amplitude $\sin(\omega' X_0)$ and $\cos(\omega' X_0)$ of corresponding harmonic signals are detected as a result of multiplying the output signals by a reference signal with the same frequency of the base harmonic signal and filtering the resultant product through a low pass filter. In this case, the results can be used to control the actuator position $X_0$ at a constant position by keeping such amplitude value constant.

These methods, however, suffer from very slow detection speed since they have to rely on low pass filtering in order to eliminate high frequency noise for the amplitude detection. They also require the arctangent function in order to obtain the value of $X_0$ over one fringe distance with good linearity by utilizing both $\sin(\omega' X_0)$ and $\cos(\omega' X_0)$ values. This slows the calculation process, and, in addition, also introduces the issues of limited resolution, accuracy and noise immunity, which limit practical use as, for example, a position encoder or similar device.

The techniques of my said earlier patents also teach how to convert the above-described sinusoidal phase modulated signal problem into a rather simple phase modulated signal problem so that many conventional approaches can be readily available in order to extract the position information.

While hereinafter explained in more full detail, my prior patent U.S. Pat. No. 6,639,686 further teaches a more general signal processing position calculation that was found to be particularly useful, involving multiplying the output voltage $V_{out}$ from the scanning probe, by the second and third order harmonic frequencies of the probe oscillation frequency, with information on an "estimated position" $\hat{X}o$ included in their phases. As a result, the same position measurement result became obtainable without requiring the controlling of the probe oscillation amplitude at any specific value, thus obviating the need for attendant extra circuits therefor. Equation (22) of this patent readily presented the error signal between the real position Xo of the probe and the estimated position $\hat{X}o$ such that, by forming a closed loop, such error signal was kept at or near zero, resulting in accurate position information being obtained at Xo=$\hat{X}$o.

While constituting a significant advance, however, this specific signal processing technique has now been found, in experimental practice, still to suffer from several further earlier-referenced limitations that particularly occur (1) as greater subnanometer precision is sought, (2) higher stage scanner movement speeds are attempted, and (3) simultaneous high accuracy and top speed measuring capabilities are desired.

It has now fortuitously been discovered, both mathematically and by experimental verification, that the above-described signal processing techniques of my earlier U.S. Pat. No. 6,639,686 can be immeasurably improved by a novel, unexpected, and deliberate use of many harmonic signals in the signal processing, (not just limited to the second and third) and further by elimination of the DC component resulting from initial signal processing multiplication and the substituting therefore of a variety of the harmonic frequencies for the amplitude detection purposes. With these signal processing changes, indeed, all of the prior limitations are surprisingly significantly reduced—(1) obviating non-linear error sensitivity of position measurement due to minute error in probe oscillation amplitude measurement; (2) maintaining position measurement occurring at high stage movement speeds; and (3) achieving simultaneously both high accuracy and top speed measuring capability.

It is to this substantially improved signal processing technique and its significant improved results, accordingly, that the present invention is therefore primarily directed.

OBJECTS OF INVENTION

It is accordingly a primary object of the present invention to provide a new and improved signal processing method and apparatus, particularly, though not exclusively, of highly beneficial use in subnanometer probe scanning position measurement systems, in encoders and in similar devices and the like, and that shall not be subject to the before-described and other limitations and problems of prior art techniques, but, to the contrary, enable the attaining of subnanometer position measurement precision, enable high-speed stage measurement (e.g. >10 mm/sec), and achieve simultaneous high accuracy and top speed measuring capability.

Another object is to provide such an improved method and apparatus that utilize novel signal processing involving a large number of multiple harmonics of the probe oscillation sensor frequency(ies) and in a novel, but computationally simple way, yet significantly reducing the limitations of previous methods.

Still an additional object is to provide such an apparatus in which multiple harmonic frequencies with scheduled gains depending on the probe velocity are used for determining the instantaneous error between the real position and the estimated position of the probe.

Another object is to provide such an improved apparatus which enables calibration without relying upon the absolute accuracy of the probe oscillation monitoring sensor, but rather by consideration of the output signals alone.

Other and further objects will also be explained hereinafter and are more particularly delineated in the appended claims.

SUMMARY

In summary, however, from one of its broader viewpoints, the invention embraces a method of real-time processing of position measurements made by oscillations of probing sensors and/or beams scanning over undulating surfaces, such as gratings and diffraction patterns generated thereby, that comprises, generating a synthesized signal having many multiple integer harmonic frequencies of a sinusoidal phase modulated signal output of said sensor or beam produced during said oscillation scanning; basing said synthesized signal on estimated phase modulation amplitude of said oscillations and upon momentarily estimated phase information under said sinusoidal phase modulation; multiplying said signal output and the multiple harmonic frequency synthesized signal; comparing the resulting product of the multiplication with reference signals with integer multiples of said sinusoidal phase modulation signal on a continual basis; and readjusting said estimated phase information until the difference between the actual and the estimated phase information become zero.

Preferred and best mode signal processing techniques, designs and circuit configurations for implementing the invention are hereinafter fully described.

DRAWINGS

The invention will now be described in connection with the accompanying drawings, FIG. 1 of which is a reproduction of the block and schematic circuit diagram of FIG. 6 of my said earlier U.S. Pat. No. 6,639,686, illustrating my own prior art signal processing technique using two-harmonic frequency synthesizing for achieving continual probe positive measurement;

Figure 2:
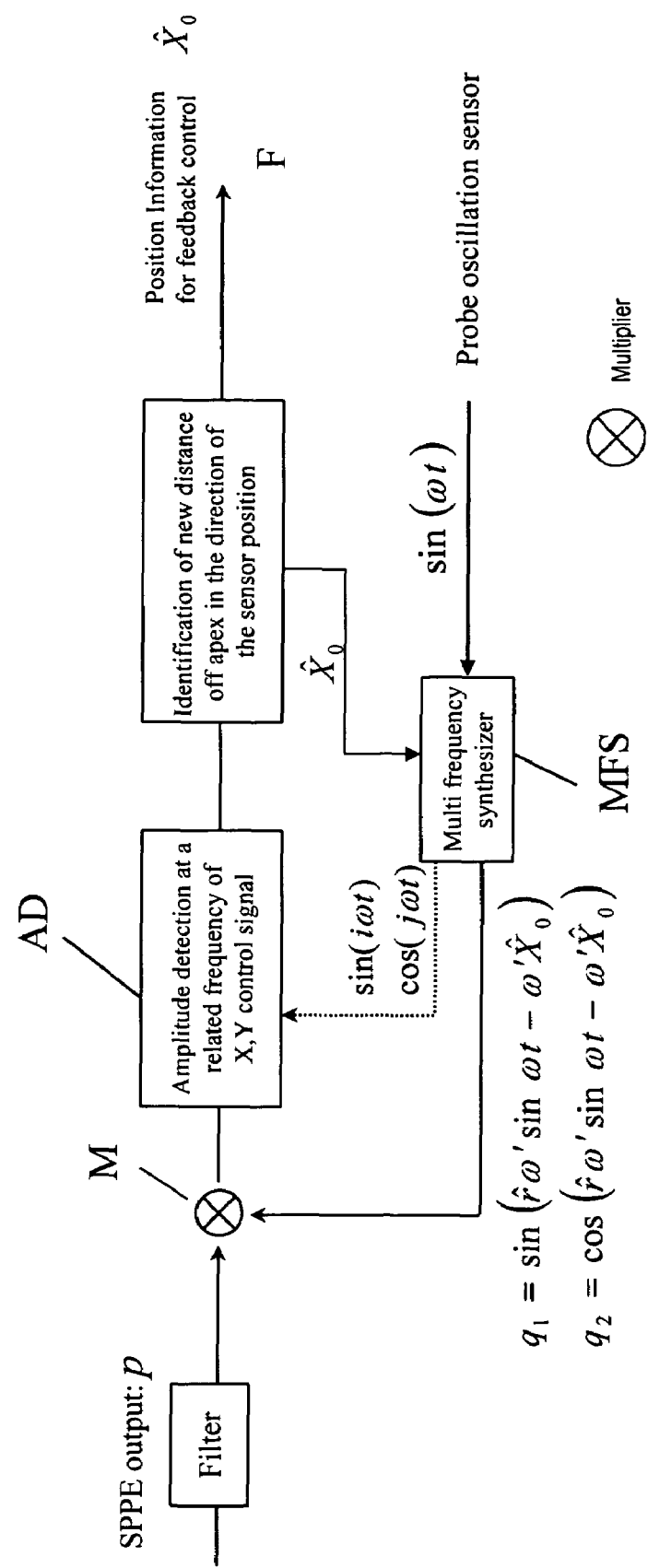
FIG. 2 is a similar diagram of the vastly improved signal processing technique of the present invention utilizing the preferred multi-frequency synthesizing of many harmonic frequencies and for amplitude detection and position information feedback control, this figure representing the simplest embodiment of the novel signal processing of the invention.
Figure 5A:
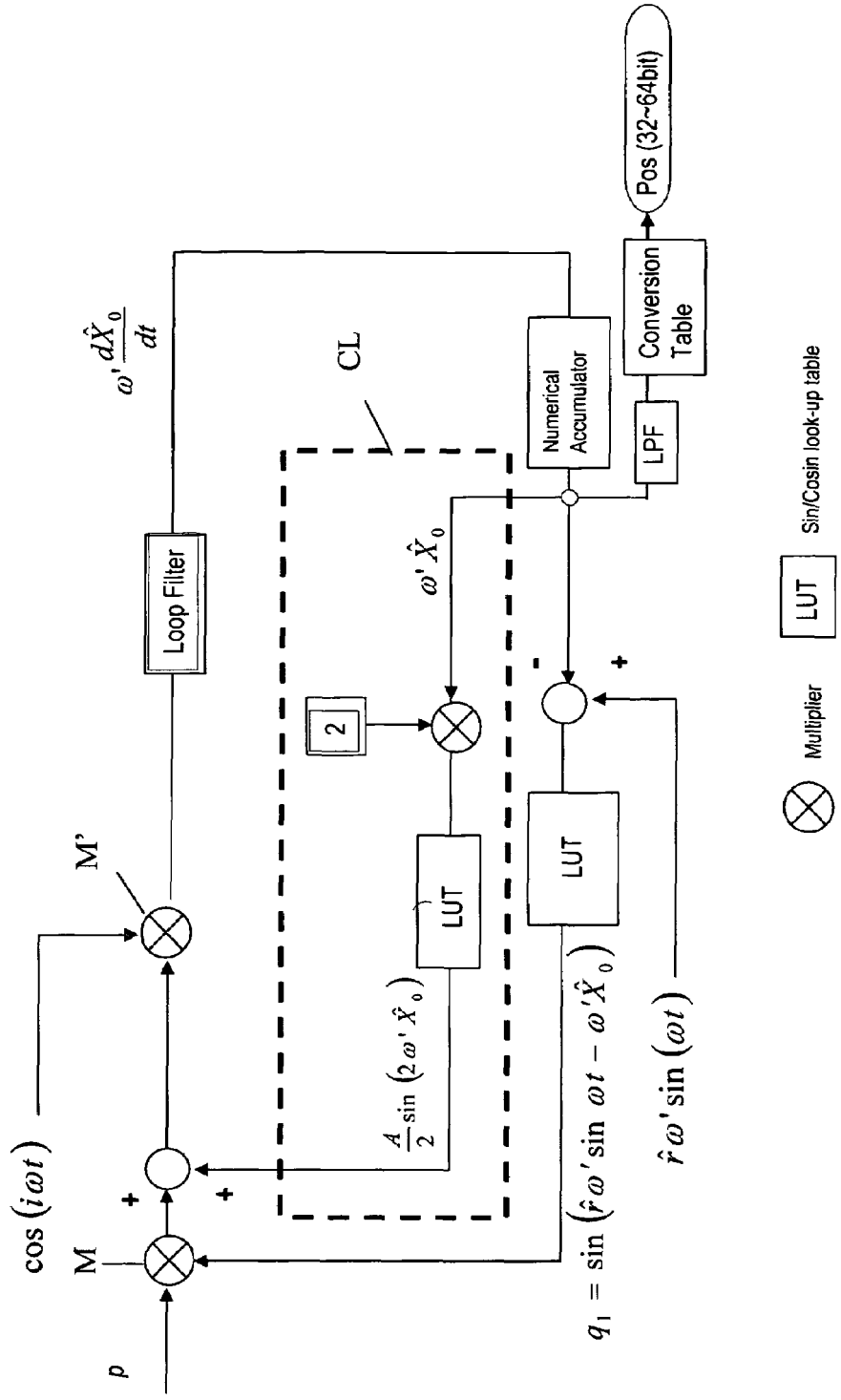
Figure 5B:
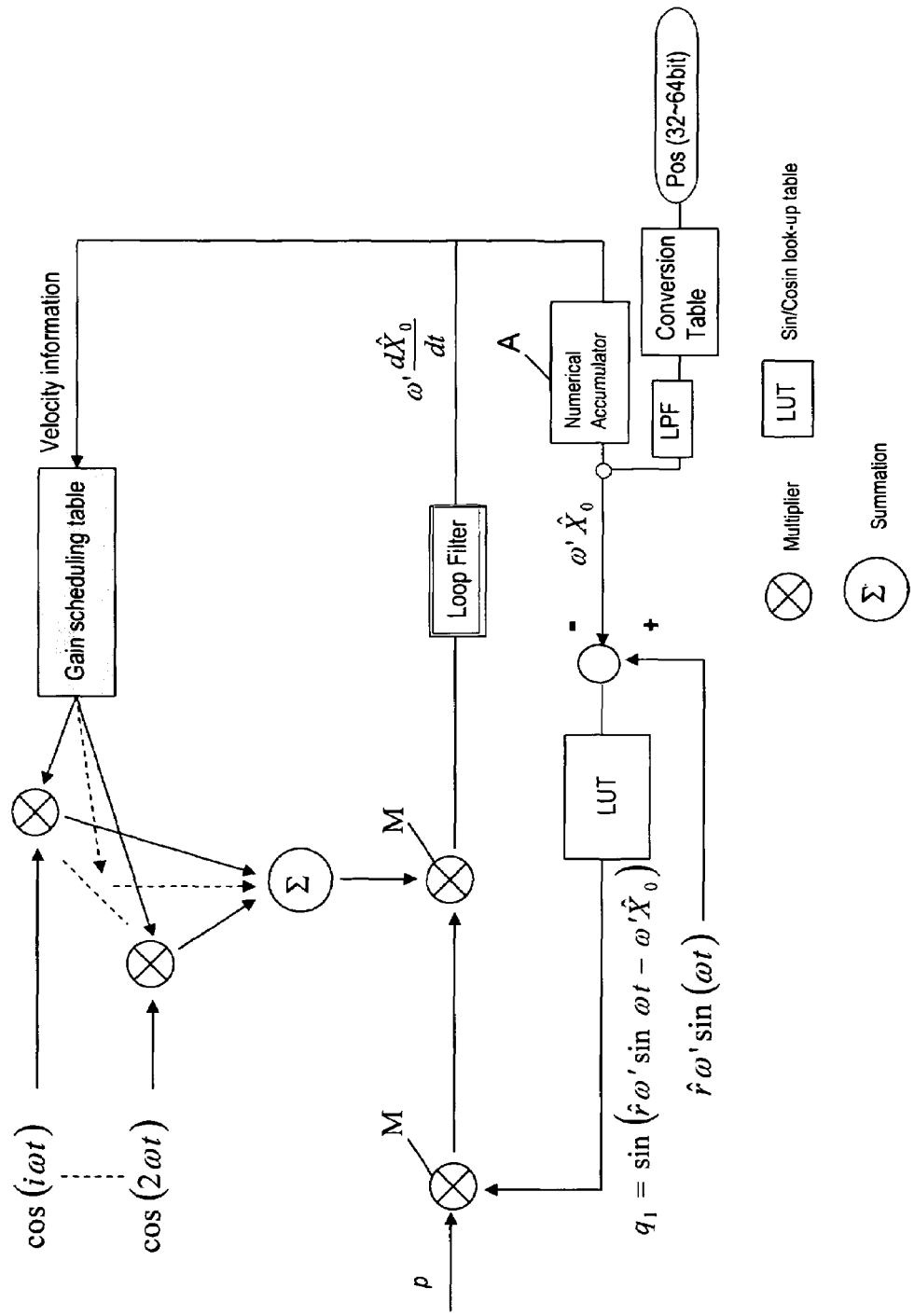
Figure 6:
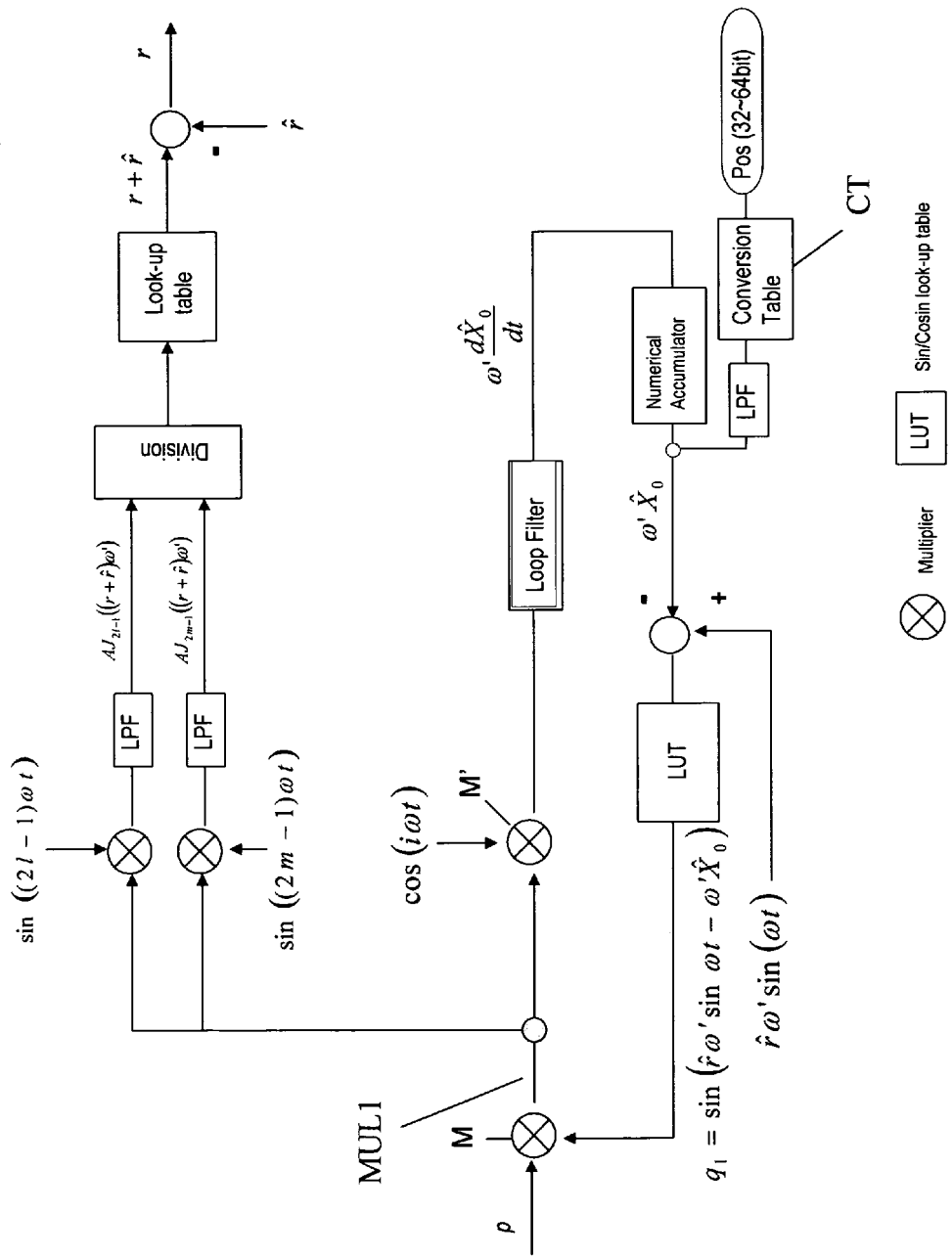

FIGS. 5A and 5B present techniques for increasing the maximum speed tracking capability over the grating or other surface by alternate schemes of velocity compensation through use of the estimated position signal, and through scheduled gains of the multiple harmonic frequencies, respectively; and FIG. 6 illustrates the use of the novel signal processing technique of the invention in accurately calibrating the probe oscillation (or grating fringe pattern) amplitude r represented in the equations presented in FIG. 2 herein.

DESCRIPTION OF PREFERRED EMBODIMENTS OF INVENTION

Since the primary thrust of the present invention resides in its improved signal processing technique discovery, the details of the scanning probes or beams, grating stage, and the generating of position signals $V_{out}$, etc., are not repeated herein, reference rather being made to my earlier patents in order not to detract from the essential details of the present invention.

Figure 1:
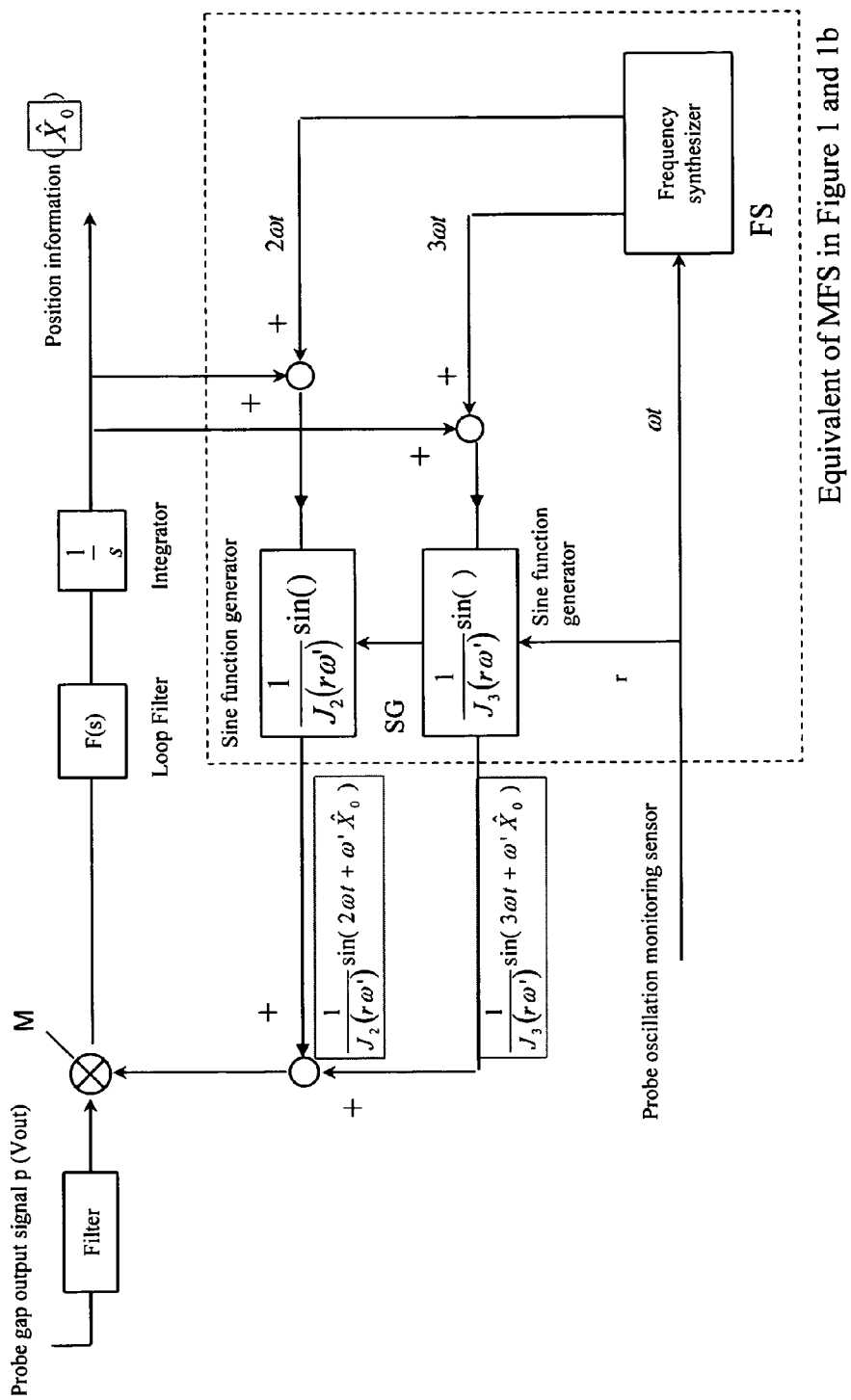

The signal processing circuit of FIG. 1, however, reproduces the prior art processing procedure of FIG. 6 of my said earlier U.S. Pat. No. 6,639,686, wherein, as earlier described, position calculation is determined by multiplying the output signal voltage $V_{out}$ from the scanning probe by $$\frac{1}{J_2(r\omega)}\sin(2\omega t + \omega \hat{X}o)$$

and also by $$\frac{1}{J_3(r\omega)}\sin(3\omega t + \omega \hat{X}o)$$

at a multiplier M, as shown in the dotted rectangular boxes. This is the prior technique before mentioned of signal processing using the specific second ($2\omega t$) and third ($3\omega t$) order harmonic signals of the probe oscillation, with estimated position information included in their phases.

This calculation flow, as explained in this patent, involves feeding the probe oscillation sensor output first to a frequency synthesizer FS while calculating the Bessel function values $J_2(r\omega)$ and $J_3(r\omega)$ in the above formula, since the probe oscillation amplitude r can be measured at the same time. In the frequency synthesizer FS, the 2 times and 3 times faster frequency signals 2 $\omega t$ and 3 $\omega t$ are generated, which are synchronized with the incoming probe-oscillation monitoring sensor output. These signals are added at +, to the instantaneous position estimation $\hat{X}o$ and fed to the sine function generator SGs as shown. The outputs from the two SGs are multiplied by the output voltage $V_{out}$ and each result is summed in order to calculate the instantaneous position estimation error stated in Equation (22). These results are fed to the loop filter F(s) and integrator, so-labeled, to recalculate new instantaneous position estimations. By repeating this process, the position estimation eventually reaches the same as the real position information and stays the same.

As earlier explained, it has now been found that the several improvements attained by the present invention can be achieved by modifying the limited second and third integer harmonic sine function generation in the frequency synthesizer FS of FIG. 1, now to be replaced, rather, by a multi-frequency synthesizer MFS, FIG. 2, generating not just two harmonic frequencies for the following amplitude detection purposes, but many more integer harmonic frequencies. Further, instead of utilizing the DC component as a result of the initial multiplication at M as in FIG. 1, the improved signal processing of the invention uses the larger variety of the multi-frequency MFS synthesizer of many harmonic frequencies [sin(i$\omega$t);cos(j$\omega$t)] for the following amplitude detection at AD in FIG. 2. This figure, indeed, represents the simplest embodiment of the improved signal processing of the invention. The output signals synthesized by MFS have the forms of a sine function within a sine/cosine function as at $q_1$ and $q_2$. This is the equivalent of synthesizing many multiple harmonic signals with particular amplitudes in each of the harmonics.

This is, however, only one application of the large multiple frequency utilization signal processing feature of the invention. A further embodiment of this is shown in FIG. 3 where there is illustrated an exemplary summation $\Sigma$ of illustrative examples of synthesis multiple harmonic signals, each with individual gain or amplitude settings, and all fed together to the multiplier M in accordance with the approach of the invention, and again enabling the new measured position distance of the adjacent undulation apex to be identified and the position information used for feedback control as so-labeled both in FIGS. 3 and 2, in accordance with the technique detailed in my earlier referenced patents.

Through this improved signal processing technique of generating synthesized multiple harmonic frequency signal q, based on the estimated phase modulation amplitude and momentarily estimated phase information under sinusoidal phase modulation (with or without quadrature phase shift), and by comparing at AD the product of the incoming probe output signal p and such MFS synthesized signals $q_1$ with reference signals with integer times the frequency of the sinusoidal phase modulation on a continual basis, the estimated phase information is continually readjusted until the difference between the actual phase and the estimated phase information becomes zero. This, as before summarized, has resulted in (1) largely obviating non-linear error sensitivity of the position measurement results due to the minute errors occurring in probe oscillation amplitude measurement. Such measurement errors cause amplitude imbalance between the output signals from the SG in FIG. 6;

(2) maintaining the position measurement accuracy when the stage moves at extremely high speed, (e.g. >10 mm/sec); and (3) attaining subnanometer precision in position measurement all the time, if desired, balancing high accuracy and top speed measuring capability at the same time.

Figure 3:
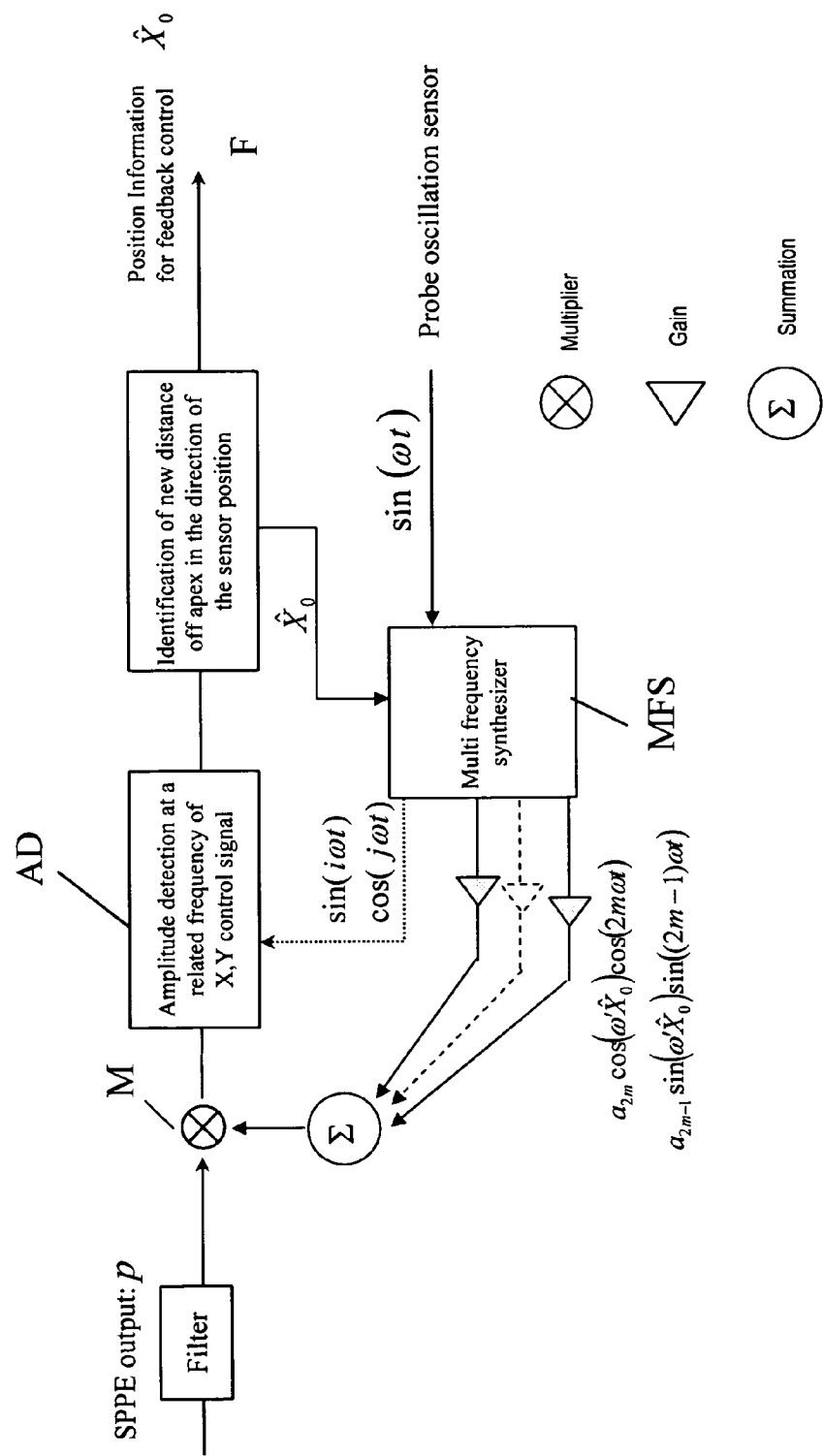
FIG. 3 illustrates another exemplary embodiment of the invention with estimation of synthesized multiple harmonic signals, each with individual gain or amplitude settings and all fed together to the processing multiplier.

The advantages of utilizing such multiple-frequency components in the signal processing of the invention for obtaining reliable and robust position measurements reside, in substantial part, from its utilization of not just one or two harmonic frequency components of information, but all available information from many (substantially all) integer harmonic components, and in the unique way of the invention—i.e. introducing a specific function, comprised of "estimated" probe oscillation amplitude and instantaneous position $\hat{X}_o$, and feeding this information back at F, FIGS. 2 and 3, into the amplitude detector AD, readjusting until the error between the real and the estimated position becomes zero ($X_o = \hat{X}_o$).

Figure 4:
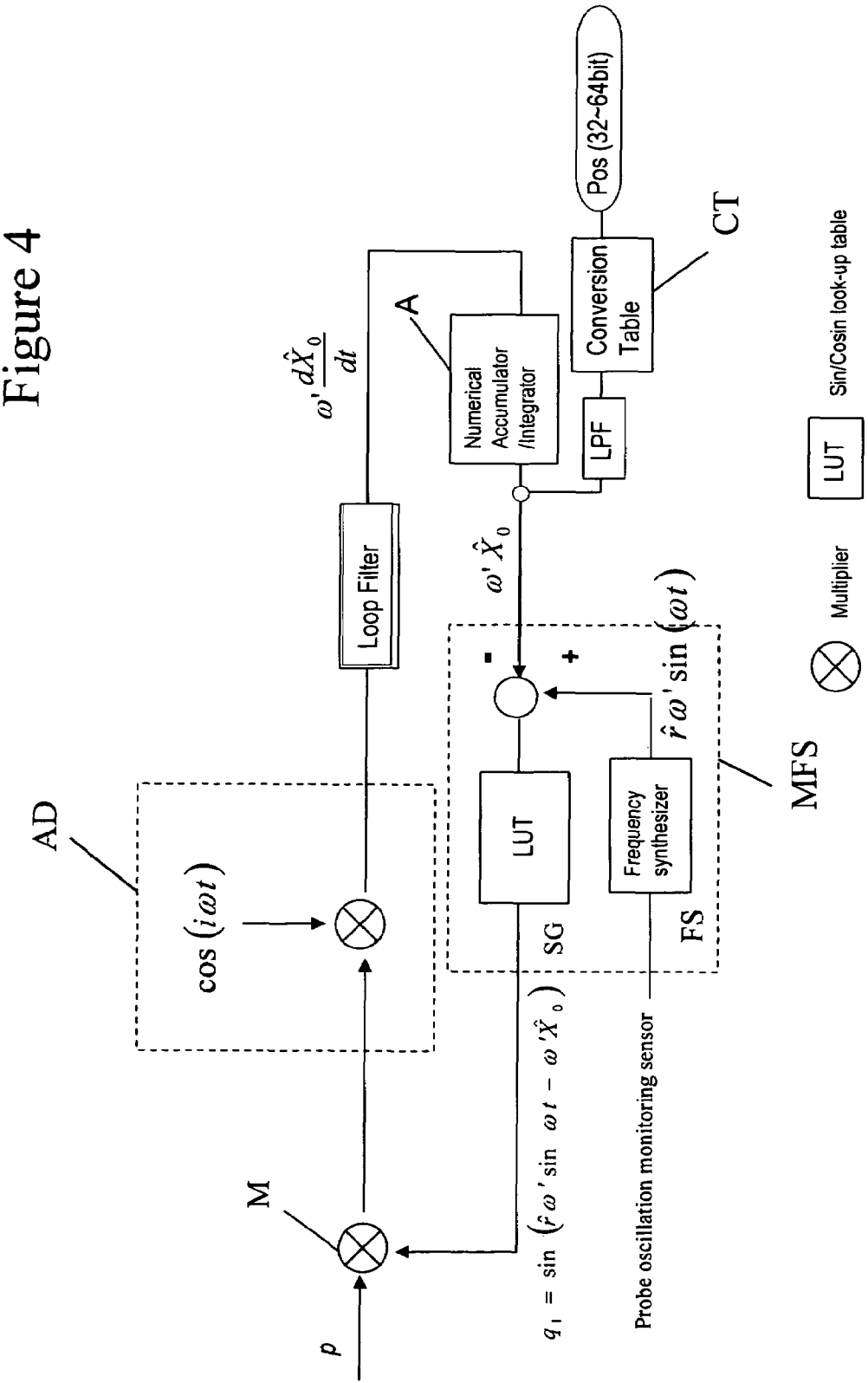
FIG. 4 is a similar diagram of a more practical and preferred implementation of the signal processing flow of FIG. 2 using look-up tables for the synthesized signal generation, and conversion tables for assisting in the correcting of residual linearity errors.

FIG. 4 shows a preferred practical circuit implementation of the improved signal processing flow of the invention described in FIG. 2. The multi-frequency synthesizer MFS of FIG. 2 is now shown in FIG. 4 as the enclosed dotted line area, so-labeled.

In this case, the incoming probe or sensor signal p is first multiplied at M by the multi-frequency synthesized signals $q_1$, which are obtained from a look-up table LUT. The resultant product $pq_1$ is again multiplied at M by cos (j$\omega$t) and fed to a loop filter. This function is the full equivalent of the AD denoted in FIG. 2, and is therefore so-labeled, enabling harmonic frequency amplitude comparison.

The output of the loop filter, in turn, represents the instantaneous velocity of the object being measured. The result of the accumulator or integrator A represents the current position estimation $\omega \hat{X}_{01}$ which is then fed through a low pass filter LPF in order to eliminate high-frequency noise before presenting a final measurement output, labeled "Position output".

The output of the low pass filter may then be fed through a conversion table CT where residual linearity error (if any) within a grating scale motion period P is corrected with better than nanometer precision. The position information $\omega X_0$ out of the numerical accumulator is again used to generate the new synthesized reference signals $q_1$ which again contain the multiple harmonics used in accordance with the invention, with the cycle readjusting and continuing as described above.

The improvements in subnanometer precision of position measurement accuracy at high stage speeds now afforded by the above-described novel signal processing techniques of the present invention, have also given rise to improvement in overall measurement and encoder system performance and capability and specifically to increasing tracking speeds and simplifying overall calibration techniques.

Treating first with the issue of tracking speed, FIG. 5A addresses increasing the maximum speed of the tracking capability through velocity compensating. A simple compensation loop L is shown in FIG. 5A as added to the system of FIG. 2. This uses amplitude information of only one single frequency component ($\cos(i\omega t)$) for determining the instantaneous error between the real position and the estimated position (function of AD in FIG. 2) and does not require any external sensors, achieving velocity compensation through using the estimated position signal.

In the modification of FIG. 5B, however, instead of introducing the velocity compensation scheme CL of FIG. 5A, the signal processing uses the multiple harmonic frequencies with scheduled gains ("Gain schematic table") depending on the current velocity ("Velocity information"). This method can be also used for more robust position detection purposes when enough computation power is available for real-time processing.

As for the invention enabling simplified calibration of the position measurement systems, there remains the requirement that the probe oscillation amplitude "r" is required to be calculated to better than a few percent accuracy.

In all of the position measurements applications utilizing my prior patent techniques, indeed, accurate measurement and control of the probe scanning amplitude "r" (Equation 1, above) is very critical for the purpose of the accurate and highly linear position reading. In fact, the fluctuation of the probe oscillation amplitude "r" or phase modulation amplitude needs to be controlled or measured better than 1% from ideal (or pre-set) value in order to obtain nanometer level of measurement precision. Such practical considerations as variation of the probe/beam amplitude over time, initial encoder set-up error between the head and the scale unit, and kinematic error in optical-mechanical design, all contribute to the equivalent fluctuation of the probe oscillation amplitude "r" or phase modulation amplitude.

In my before-described U.S. Pat. No. 6,639,686, a simple method is disclosed to estimate the probe or beam scanning amplitude "r" in Equation (1); but this method does not work well when the position $X_o$ happens to be in the vicinity where either $\sin \omega X_o$ or $\cos \omega X_o$ becomes close to zero. Since a position encoder alone, for example, usually does not have any means to shift the stage position in order to change such value to be non-zero, this requires a rather tedious iteration until the operator becomes confident of the probe or beam scan amplitude "r".

FIG. 6 shows a preferred embodiment of the present invention using the improved signal processing concepts of the invention to now allow for calibration of the probe oscillation (or phase modulation) amplitude, and while the stage is in motion. To explain the operation of FIG. 6, additional mathematical equations are deemed helpful.

As before explained, the improved signal processing techniques of the invention employ the generating of the synthesized multifrequency signals identified in FIG. 2 at the output of the multi-frequency synthesizer MFS and generalized as:

$$q = \sin(\hat{r}\omega \sin \omega_r t - \omega \hat{X}_o), \quad (2)$$

where $\hat{r}$ and $\hat{X}_o$ respectively indicate the estimated probe or optical or (laser beam) oscillation radius and the estimated position. As indicated, the synthesized signal q differs from Equation (1) previously presented in the sign of the position and the 90° degree shifted phase.

Multiplying the probe output signal p of equation (1) by the synthesized signal q of Equation (2) at M in FIG. 2, the following product pq is obtained:

$$2pq = A \sin((\hat{r}+r)\sin \omega t + \omega(X_o - \hat{X}_o)) + A \sin((\hat{r}-r) \sin \omega_r t - \omega(X_o + \hat{X}_o)). \quad (3)$$

Assuming that $r \approx \hat{r}$, Equation (3) can be rearranged as:

$$2pq \approx -A\sin(\omega(X_o + \hat{X}_o)) + AJ_0((r+\hat{r})\omega)\sin(\omega(X_o - \hat{X}_o)) + \quad (4)$$
$$2A\cos(\omega(X_o - \hat{X}_o))\sum J_0((r+\hat{r})\omega)\sin(2m-1)\omega_{r1}$$
$$-2A\sin(\omega(X_o - \hat{X}_o))\sum J_{2m}((r+\hat{r})\omega)\cos 2m\omega_{r1}.$$

This result indicates, incidentally, that again many well-known synchronous phase detection methods may be used in order to obtain accurate $\hat{X}_o$ values.

The invention takes advantage of the newly created signal shown in Equation (4) based on the multi-frequency synthesizer method disclosed in FIG. 2. In this case, the amplitude of each of the many harmonics of the multiplied output signal becomes either 1 or 0 once the estimated position information is locked into the actual position information. For example, Equation (4) shows when the conditions $\hat{r} \approx r$ and $X_o \approx \hat{X}_o$ are roughly satisfied, the amplitude of the 2m–1 th frequency components become approximately $AJ_{2m-1}((r+\hat{r})\omega))$. In this particular case, $AJ_{2m-1}((r+\hat{r})\omega)$ alone may not be used as a method to measure the amplitude "r" accurately since the value of "A" may change over time. By measuring such amplitudes of more than the two harmonics used in the prior art (FIG. 1), and comparing these amplitudes, one can, however, identify the probe scanning amplitude "r".

In FIG. 6, therefore, 2m–1 and 2l–1 th frequency components are chosen for the estimation of the probe scanning amplitude. By multiplying the result, which is indicated as MUL', by $\sin((2m-1)\omega t)$ and $\sin((2l-1)\omega t)$, and then by filtering each result through a low pass filter denoted as LPF, one can obtain $AJ_{2m-1}((r+\hat{r})\omega)$ and $AJ_{2l-1}((r+\hat{r})\omega)$, respectively (shown at the top center of the figure). The ratio between the two results should then be the function of $(r+\hat{r})$ only, since the spatial frequency of the grating scale and currently estimated oscillation amplitude (phase modulation amplitude) $\hat{r}$ is known. Obviously, from this information, the actual calibrated probe scanning amplitude "r" is obtained.

The system of FIG. 6, as earlier mentioned, can be used regardless of the current probe position, and while the stage is still moving.

The underlying concept of FIG. 6 resides in the novel use of amplitude information in the multiple harmonics of the synthesized signals of the invention described in Equation (4), and not only for position estimation purposes, but also for probe oscillation amplitude (phase modulation amplitude) estimation purposes as well.

Further modifications will occur to those skilled in this art, and such are accordingly considered to fall within the spirit and scope of the invention, more particularly as delineated in the appended claims.

What is claimed is:

1. A method of real-time processing of position measurements made by oscillations of probing sensors and/or beams scanning undulating surfaces, including gratings and diffraction patterns generated thereby, that comprises, generating a synthesized signal having many multiple integer harmonic frequencies of a sinusoidal phase modulated signal output of said sensor or beam produced during said oscillation scanning;

basing said synthesized signal on estimated phase modulation amplitude of said oscillations and upon momentarily estimated phase information under said sinusoidal phase modulation;

multiplying said signal output and the multiple harmonic frequencies of the synthesized signal;

comparing the resulting product of the multiplication with reference signals with integer multiples of said sinusoidal phase modulation signal on a continual basis; and readjusting said estimated phase information until the difference between the actual and the estimated phase information becomes zero, wherein the synthesized signal has the form of a sine function within a sine/cosine function and, wherein the generated synchronized multifrequency signal q is given by $q=\sin(\hat{r}\omega \sin \omega t - \omega \hat{X}_o)$ where $\hat{r}$ and $\hat{X}_o$ represent the estimated probe or beam oscillation radius and the estimated probe or beam position respectively, and $\omega$ is the oscillation frequency and t represents time.

2. The method of claim 1 wherein said comparing includes amplitude detection of many of said harmonic frequencies.

3. The method of claim 1 wherein said many harmonic frequencies are much larger than just two harmonic components.

4. The method of claim 1 wherein the signal processing uses information from a plurality of multiple frequency-synthesized signal components while introducing the estimated probe oscillation amplitude and instantaneous probe position information; and feeding back such information into the amplitude detection until the error between the real and the estimated position becomes zero.

5. The method of claim 1 wherein said amplitude detection function is effected by further multiplying said product by cos (i$\omega$t) and feeding the resulting product to a loop filter.

6. The method of claim 1 wherein multiple harmonic components of the synthesized signal are individually amplitude or gain adjusted and are fed together for said multiplying.

7. The method of claim 1 and in which scanning and tracking velocity capability is controlled by velocity compensation through adding a compensation control loop using amplitude information of a frequency component for determining the instantaneous error between the real position and the estimated probe position.

8. The method of claim 1 wherein scanning and tracking velocity capability is controlled by using the multiple harmonic frequencies with scheduled gains depending on the current velocity information.

9. The method of claim 1 wherein amplitude information in the multiple harmonics of the synthesized signal is used not only for position estimation purposes, but also for probe oscillation amplitude (r) calibration or phase modulation amplitude estimation purposes.

10. The method of claim 9 wherein the calibration of the probe scanning amplitude (r) is effectable while the scanning stage is still moving.

11. The method of claim 9 wherein the amplitude of each of the many harmonics of the multiplied output signal becomes either 1 or 0 once the estimated position information is locked into the actual position information.

12. The method of claim 11 wherein the measuring of such amplitude and comparing the same, enables identifying the probe scanning amplitude (r).

13. Apparatus for real-time signal processing of position measurements made by oscillations of probing sensors and/or beams scahning undulating surfaces, including gratings and diffraction patterns generated thereby, the apparatus having, in combination, a synthesizing signal generator of many multiple integer harmonic frequencies of a sinusoidal phase modulated signal output of said sensor or beam produced during said oscillation scanning;

the generator of said synthesized signal being referenced to inputs on estimated phase modulation amplitude of said oscillations and upon momentarily estimated phase information under said sinusoidal phase modulation;

a multiplier for multiplying said signal output and the multiple harmonic frequency synthesized signal;

a comparator for comparing the resulting product of the multiplication with reference signals with integer multiples of said sinusoidal phase modulation signal on a continual basis and for readjusting said estimated phase information until the difference between the actual and the estimated phase information becomes zero, and wherein the synthesized signal has the form of a sine function within a sine/cosine function, and wherein the generated synthesized multifrequency signal q is given by $$q=\sin(\hat{r}\omega \sin \omega t - \omega \hat{X}_o),$$

where $\hat{r}$ and $\hat{X}_o$ represent the estimated probe or beam oscillation radius and the estimated probe or beam position respectively, and $\omega$ is the oscillation frequency and t represents time.

14. The apparatus of claim 13 wherein said comparator includes an amplitude detector of many of said harmonic frequencies.

15. The apparatus of claim 14 wherein said many harmonic frequencies are much larger than just two harmonic components.

16. The apparatus of claim 13 wherein the signal processing uses information from a plurality of the multiplier frequency synthesized signal components while introducing the estimated probe oscillation amplitude and instantaneous probe position information; and a feedback circuit is provided for feeding such information back into the amplitude detection until the error between the real and the estimated position become zero.

17. The apparatus of claim 13 wherein said amplitude detector function is effected by a further multiplier of said product by cos(i$\omega$t) and by feeding the resulting product to a loop filter.

18. The apparatus as claimed in claim 13 wherein gain controls are provided for the multiple harmonic components of the synthesized signal for enabling individual amplitude or gain adjustment, and for feeding together to said multiplier.

19. The apparatus of claim 13 wherein scanning and tracking velocity capability is controlled by a velocity compensation control loop using amplitude information of a frequency component for determining the instantaneous error between the real position and the estimated probe position.

20. The apparatus of claim 13 wherein scanning and tracking velocity capability is controlled by using the multiple harmonic frequencies with scheduled gains, depending on the current velocity information.

21. The apparatus of claim 13 wherein amplitude information in the multiple harmonics of the synthesized signal is used not only for position estimation purposes, but also for probe oscillation amplitude (r) calibration or phase modulation amplitude estimation.

22. The apparatus of claim 21 wherein the calibration of the probe scanning amplitude(r) is effected while the scanning stage is still moving.

23. The apparatus of claim 13 wherein the multiple frequency generator comprises a frequency synthesizer responsive to the output of the probe sensor, and an adder for adding the synthesized output to the estimated position signal, with the resulting sum compared with a sine/cosine look-up table to generate the synthesized multiple harmonic signal.

24. The apparatus of claim 23 wherein the multiplier of the synthesized multiple harmonic signal and the probe sensor output feeds an amplitude detector comprising a further multiplier into which a/cos(jωt) signal is also fed, and the output of which is connected through a loop filter to a numerical accumulator integrator.

25. The apparatus of claim 24 wherein the output of said integration is connected to said adder to feed said estimated current probe position signal.

26. The apparatus of claim 25 wherein the current probe estimate position signal is fed through a low pass filter through a conversion table for presenting a final position output.

27. The apparatus of claim 26 wherein the position information in said output of said integrator is then used to generate a new synthesized reference signal containing the multiple harmonics.

* * * * *